(12) United States Patent
Endo (10) Patent No.: US 7,539,403 B2
(45) Date of Patent: May 26, 2009

(54) IMAGE-TAKING APPARATUS

(75) Inventor: Hiroshi Endo, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 499 days.

(21) Appl. No.: 11/482,735

(22) Filed: Jul. 10, 2006

(65) Prior Publication Data

US 2007/0014553 A1    Jan. 18, 2007

(30) Foreign Application Priority Data

Jul. 14, 2005  (JP) ............... 2005-205902

(51) Int. Cl.
- G03B 17/00  (2006.01)
- G03B 15/03  (2006.01)
- H04N 5/222  (2006.01)
- H04N 5/228  (2006.01)

(52) U.S. Cl. .................. 396/52; 396/55; 396/153; 396/155; 396/182; 348/371; 348/208.99; 348/208.12; 348/208.16

(58) Field of Classification Search .......... 396/52, 396/55, 106, 109, 153, 155, 182; 348/208.99, 348/208.12, 208.16, 371
See application file for complete search history.

(56) References Cited

U.S. PATENT DOCUMENTS

2006/0083507 A1 *   4/2006   Endo ................... 396/155

FOREIGN PATENT DOCUMENTS

JP   2003-179808 A   6/2003

* cited by examiner

Primary Examiner—W. B. Perkey
Assistant Examiner—Minh Phan
(74) Attorney, Agent, or Firm—Sughrue Mion, PLLC (57) ABSTRACT

An image-taking apparatus includes a LED emission section that irradiates a subject with light by causing a LED to emit the light and a xenon-tube emission section that irradiates a subject with light by causing a xenon tube to emit the light. The light from the xenon-tube emission section has higher intensity than the light from the LED emission section. The image-taking apparatus also includes a shake detection section that predicts a shake that will occur at shooting by detecting a shake before shooting. The image-taking apparatus also includes an emission control section that causes the xenon-tube emission section to irradiate a subject with light when the detected shake is above a predetermined level, and causes the LED emission section to irradiate a subject with light when the detected shake is equal to or below the predetermined level.

5 Claims, 11 Drawing Sheets

IMAGE-TAKING APPARATUS

BACKGROUND OF THE INVENTION

1. Field of the Invention

The present invention relates to an image-taking apparatus that includes an imaging device and forms a subject image on the imaging device thereby generating image signals.

2. Description of the Related Art

The emergence of blue light-emitting diodes has made it possible to generate white light with light-emitting diodes. As a result, there is a trend to replace incandescent lamps consuming a large amount of power with light-emitting diodes (LED) consuming a small amount of power for the purpose of reducing power consumption. Such a trend has been also seen in the field of digital cameras and the LEDs are replacing xenon tubes used for fill in shooting. LEDs require no charging of a capacitor because they are capable of emitting light with low voltage while xenon tubes require charging. Therefore, LEDs have such an advantage that the waiting time between one emission and the next emission is shorter than xenon tubes. On the other hand, LEDs have such a drawback that the intensity of emission is lower than xenon tubes. There is a shooting apparatus having plural LEDs in order to increase the intensity of emission (see Japanese Patent Application Publication No. 2003-179808 for example).

However, it is not realistic to provide a large number of LEDs in a shooting apparatus to attain the intensity of emission equal to that of a xenon tube in view of restrictions such as limited space. Therefore, when LEDs are employed as a light source, along emission time is necessary to accumulate the amount of light. However, during such a long emission time, movement of a shooting apparatus i.e. shake as well as blurring of a subject image due to movement of a subject are likely to frequently occur.

The present invention has been made in view of the above circumstances, and provides an image-taking apparatus capable of reducing waiting time between shootings and blurriness of a subject image.

SUMMARY OF THE INVENTION

A first image-taking apparatus according to the invention includes an imaging device and generates image signals by forming a subject image on the imaging device, the image-taking apparatus includes:

a LED emission section that includes a LED and irradiates a subject with light by causing the LED to emit the light;

a xenon-tube emission section that includes a xenon tube and irradiates a subject with light by causing the xenon tube to emit the light, the light from the xenon-tube emission section having relatively higher intensity than the light from the LED emission section;

a shake detection section that predicts a shake that will occur at shooting by detecting a shake before shooting, and an emission control section that causes the xenon-tube emission section to irradiate a subject with light when the shake detected by the shake detection section is above a predetermined level, and causes the LED emission section to irradiate a subject with light when the shake detected by the shake detection section is equal to or below the predetermined level.

In the first image-taking apparatus of the invention, light is emitted from the xenon tube when a shake detected before shooting is above a predetermined level whereas light is emitted from the LED when a shake detected before shooting is equal to or below the predetermined level. Therefore, it is possible to reduce blurriness of a subject image by use of the xenon tube even in a situation, for example, where a large shake is likely to occur in shooting by an inexperienced user, while reducing waiting time between one shooting and the next shooting by use of the LED requiring no charging time. Accordingly, the first image-taking apparatus of the invention is capable of reducing the waiting time between shootings as well as blurriness of subject image.

The first image-taking apparatus according to the invention may further include a shooting lens of variable focal length, wherein the emission control section causes either one of the xenon-tube emission section and the LED emission section to irradiate a subject with light based on both the shake detected by the shake detection section and a focal length of the shooting lens to be used at shooting.

Because a subject image formed on the imaging device expands and contracts according to the focal length of the shooting lens, a blur of the subject image changes depending on the focal length of the shooting lens. Therefore, the first image-taking apparatus of the invention is additionally configured to select either the xenon-tube emission section or the LED emission section based on the focal length of the shooting lens so that blurriness of a subject image can be appropriately reduced.

A second image-taking apparatus according to the invention includes an imaging device and generates image signals by forming a subject image on the imaging device, the second image-taking apparatus further includes:

a LED emission section that includes a LED and irradiates a subject with light by causing the LED to emit the light;

a xenon-tube emission section that includes a xenon tube and irradiates a subject with light by causing the xenon tube to emit the light, the light from the xenon-tube emission section having relatively higher intensity than the light from the LED emission section;

a blur detection section that predicts a blur of a subject image which will occur at shooting by detecting a movement of a subject image before shooting, and an emission control section that causes the xenon-tube emission section to irradiate a subject with light when the blur detected by the blur detection section is above a predetermined level, and causes the LED emission section to irradiate a subject with light when the blur detected by the blur detection section is equal to or below the predetermined level.

Blurs of subject image include those caused by a shake of the image-taking apparatus and those caused by a movement of a subject.

In the second image-taking apparatus of the invention, light is emitted from the xenon tube when a blur detected before shooting is above a predetermined level whereas light is emitted from the LED when a blur detected before shooting is equal to or below the predetermined level. Therefore, it is possible to reduce not only blurriness caused by shakes of the image-taking apparatus but also blurriness caused by movements of a subject, while reducing the waiting time between shootings.

The second image-taking apparatus may further include a focus adjustment section that selects any of a plurality of areas, into which a shooting angle of view is divided, to adjust focus in the selected area, wherein the blur detection section detects a blur of a subject image in the area selected by the focus adjustment section.

In an area where focusing is adjusted by the focus adjustment section, a subject image is sharply formed and therefore, a blur of the subject image is most likely to be observed. Also, this area usually receives more attention and the elimination of blur is desired most in this area. Because a blur of a subject image is detected in such a focus adjustment area, it is possible to reduce blurriness of a subject image in this area.

The second image-taking apparatus may further include a face recognition section that recognizes a face position of a subject within the shooting angle of view, wherein the blur detection section detects a blur of a subject image in the face position recognized by the face recognition section.

A face position recognized by the face recognition section usually receives more attention in a shooting angle of view and the elimination of blur is desired most in this position. Accordingly, it is possible to reduce blurriness of a subject image in an area where the elimination of blur is desired most by detecting a blur of a subject image in such a face position.

As described above, the invention realizes image-taking apparatus capable of reducing the waiting time between shootings as well as blurriness of a subject image.

DETAILED DESCRIPTION OF THE INVENTION

Embodiments of the present invention will be described with reference to the drawings.

Figure 1A:
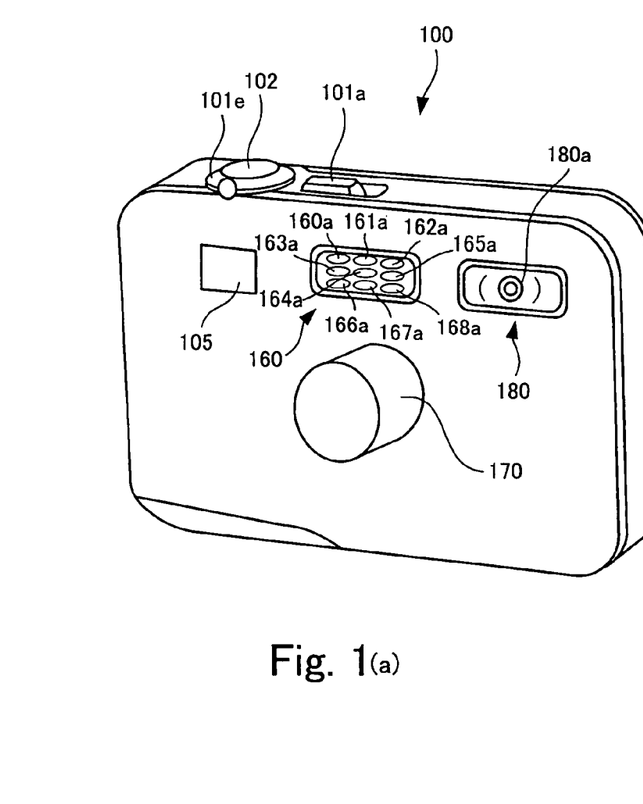
FIGS. 1(a) and 1(b) show a digital camera according to a first embodiment of the present invention.
Figure 1B:
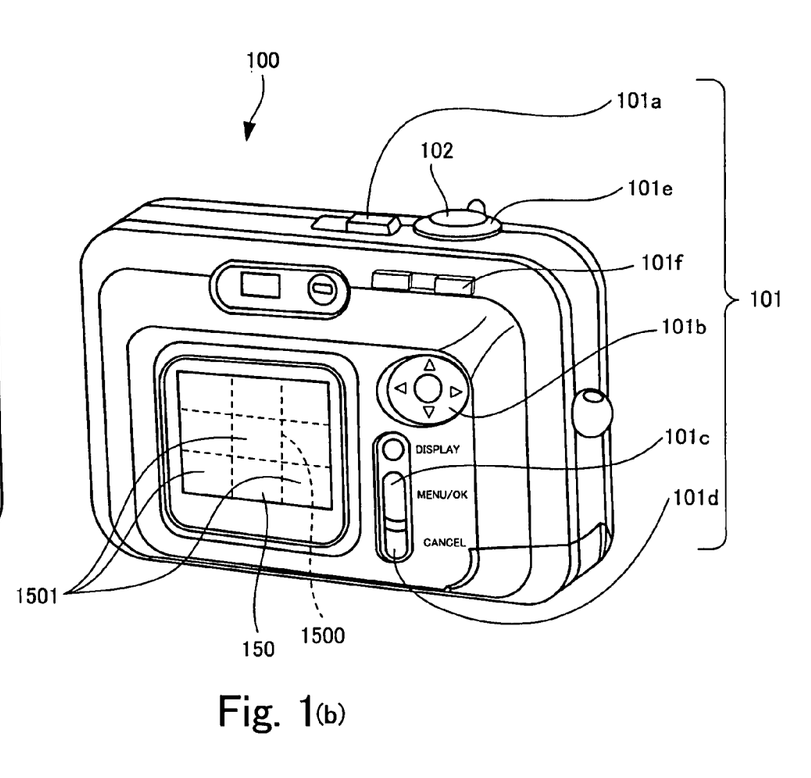

FIGS. 1(a) and 1(b) show a digital camera 100 according to a first embodiment of the present invention. FIGS. 1(a) and 1(b) show the front and back of the digital camera 100 according to the first embodiment, as viewed obliquely from above, respectively.

As shown in FIG. 1(a), provided at the center of the digital camera 100 is a lens barrel 170 having a built-in image-taking optical system including a shooting lens. An image of a subject is led through the image-taking optical system to a charge coupled device (CCD) serving as an imaging device disposed inside the digital camera 100. As will be described later, the digital camera 100 is configured such that the CCD generates image signals representing a through image (live view) and a taken image and a main CPU performs a through-the-lens (TTL) distance measurement and TTL metering based on the image signals in order to detect subject distance and subject brightness.

The TTL distance measurement is performed to each of distance-measurement areas into which a shooting angle of view is two-dimensionally divided. The TTL metering is also performed to each of metering areas into which a shooting angle of view is two-dimensionally divided.

The focal length of the shooting lens built in the lens barrel 170 is variable and therefore, a shooting angle of view can be adjusted according to an operation.

As shown in FIG. 1(a), a finder 105, an LED emission section 160 and a xenon-tube emission section 180 are disposed above the lens barrel 170 of the digital camera 100. The LED emission section 160 has LEDs 160a through 168a and irradiates a subject with fill light for shooting emitted from these LEDs. Although the digital camera 100 shown in FIG. 1(a) is provided with plural LEDs 160a through 168a, only one LED may be provided instead. The xenon-tube emission section 180 has a xenon tube 180a and irradiates a subject with fill light for shooting emitted from the xenon tube 180a, which light is relatively higher in intensity than the light from the LED emission section 160. Because the xenon tube 180a is capable of emitting light whose intensity is higher than the LEDs 160a through 168a, the xenon-tube emission section 180 can irradiate a subject with an appropriate amount of light required for exposure in a short time. In contrast, the LEDs 160a through 168a can be quickly ready for the next emission after an emission because they emit light with low voltage requiring no charging time; i.e. waiting time for the next emission is short. The digital camera 100 of the first embodiment is configured to irradiate a subject with fill light from either the LED emission section 160 or xenon-tube emission section 180 according to a level of a camera shake detected before shooting.

As shown in FIG. 1(b), disposed on the back and top of the digital camera 100 is an operating switch group 101 for allowing a user to perform various operations therethrough when using the digital camera 100.

The operating switch group 101 includes a power switch 101a, a release button 102, a cross key 101b, a MENU/OK key 101c, a cancel key 101d, a mode lever 101e, a zoom key 101f and the like. The mode lever 101e is used to switch between a playback mode and a shooting mode and to switch between a moving-image mode and a still-image mode in the shooting mode. When the shooting mode is selected by the mode lever 101e, a through image (live view) is displayed and a user can take an image by pressing the release button 102 while looking at the through image. When the playback mode is selected by the mode lever 101e, a taken image is displayed on a LCD panel 150. The zoom key 101f is used to adjust the focal length of the shooting lens built in the lens barrel 170.

In this digital camera 100, the shooting mode includes various AF modes such as a selected-area AF mode and an auto-area AF mode. When the selected-area AF mode is selected by operating the menu/OK key 101c while the shooting mode is selected, auxiliary dividing lines 1500 dividing a shooting angle of view into multiple areas 1501 are displayed on the LCD panel 150 as shown in FIG. 1(b) together with a through image. In this condition, when the user selects any area among the divided areas 1501 by operating the cross key 101b, the selected area is set as a distance-measurement area (hereinafter also referred to as an AF area) where distance measurement is to be performed.

The release button 102 has two operation stages: half-press and full-press. Upon half-press of the release button 102, both of TTL metering and TTL distance measurement are performed, a diaphragm with an aperture corresponding to a photometric value is set at the optical axis, and a focus lens is arranged at a position based on the result of distance measurement within a focus area. Subsequently, upon full-press of the release button 102, an electronic shutter is set for the imaging device, and exposure is performed for shooting. If it is determined that emission of fill light is necessary at the time of half-press, fill light is emitted toward irradiation areas from either the LED emission section 160 or the xenon-tube emission section 180 at the time of full press.

Figure 2:
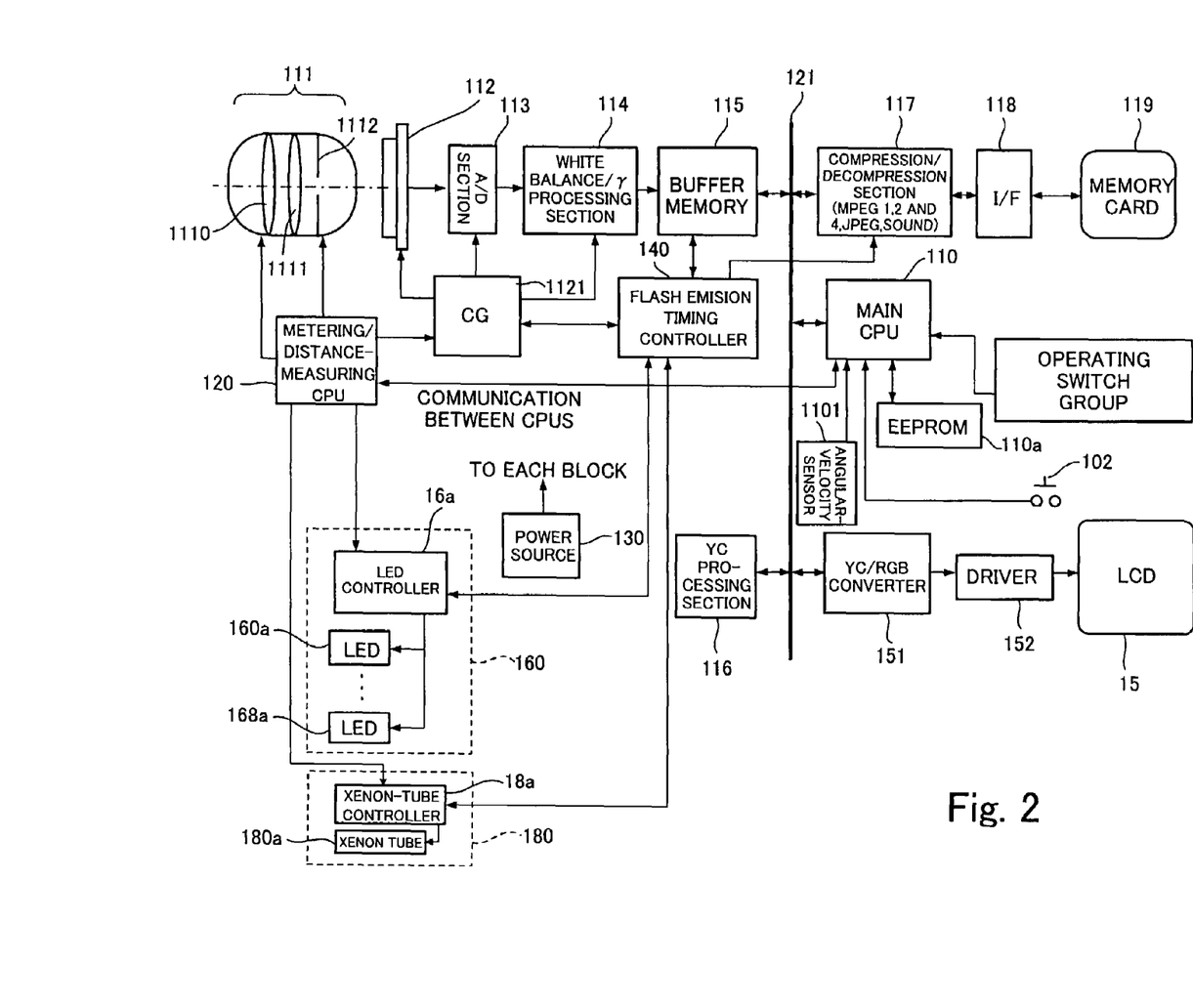
FIG. 2 is a block diagram of the digital camera shown in FIGS. 1(a) and 1(b)

FIG. 2 is a block diagram illustrating the internal configuration of the digital camera 100 shown in FIGS. 1(a) and 1(b).

Figure 3:
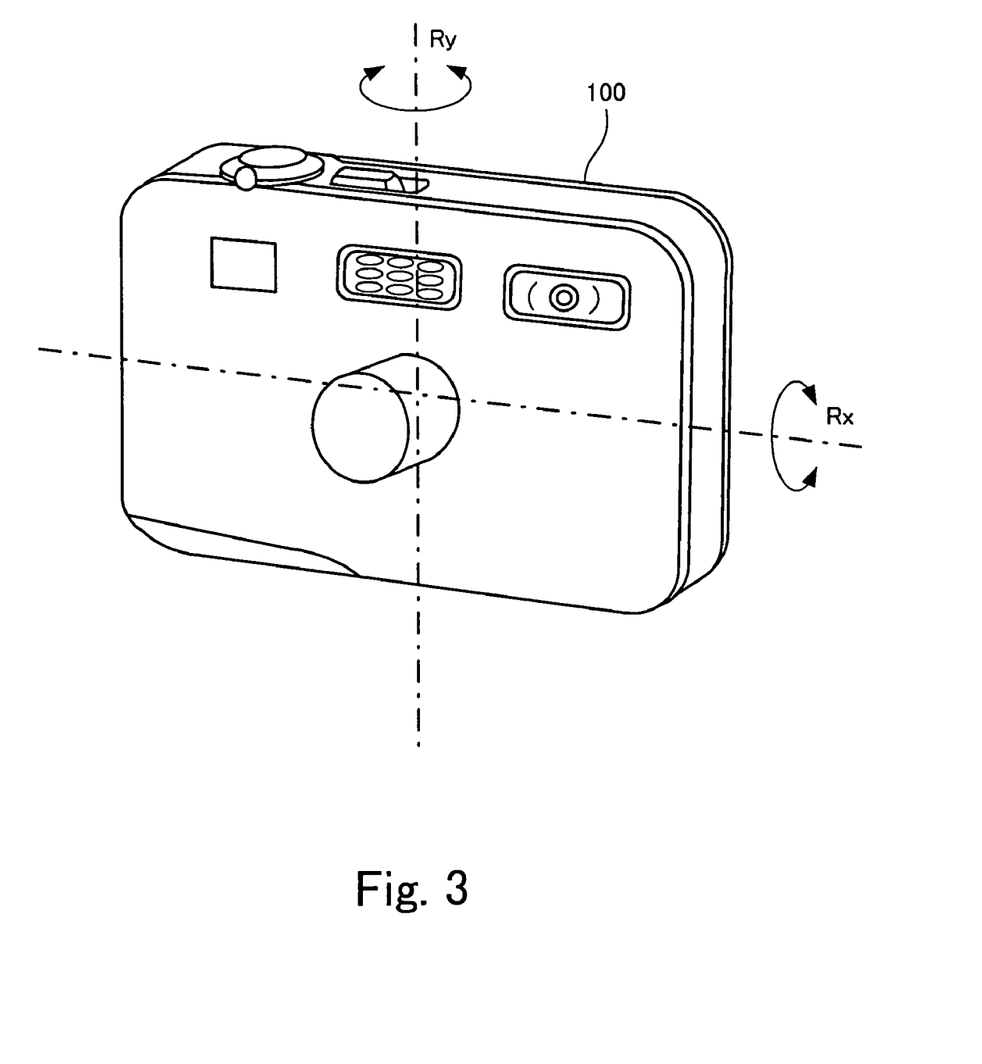
FIG. 3 is a diagram useful for understanding a shake of the digital camera shown in FIGS. 1(a) and 1(b)

The digital camera 100 of the first embodiment includes a main CPU 110 that controls all processing in the digital camera 100. The digital camera 100 also includes an angular-velocity sensor 1101 for detecting shake of the digital camera 100. The angular-velocity sensor 1101 detects shake of the digital camera 100 as a turning angular velocity of turns Rx and Ry (see FIG. 3) and supplies the detection result to an input section of the main CPU 110 as shake information.

The main CPU 110 includes an EEPROM 110a that stores a program necessary for the operation of the digital camera 100. When the power switch 101a (see FIGS. 1(a) and 1(b)) of the digital camera 100 having such a configuration is turned on, the main CPU 110 starts controlling all the operation of the digital camera 100 according to procedures described in the program stored in the EEPROM 110a.

Now, the flow of image signals will be described with referenced to FIG. 2.

When the power switch 101a (see FIGS. 1(a) and (b)) is turned on, the main CPU 110 detects turning on of the power switch 101a and a power source 130 supplies power to blocks such as the main CPU 110, a metering/distance-measuring CPU 120 and the like. If the shooting mode is selected by the mode lever 101e (see FIG. 1(b)) of the operating switch group 101 at the time of turning on the power switch 101a, image signals representing a subject image formed on a CCD 112 are thinned out and output at predetermined intervals so that the subject image represented by the output image signals is displayed on the LCD panel 150. The CCD 112 receives timing signals from a clock generator (CG) 1121. Image signals are thinned out and output at predetermined intervals according to the timing signals. The CG 1121 outputs timing signals under instructions from the main CPU 110. Such timing signals are also sent to, in addition to the CCD 112, an A/D section 113 and a white-balance (WB) adjustment γ processing section 114 which are provided in subsequent stages. Accordingly, in synchronization with the timing signals, image signals are sequentially processed in the CCD 112, the A/D section 113 and the WB adjustment γ processing section 114 in the correct order.

After being processed by the A/D section 113 and the WB adjustment γ processing section 114 at predetermined intervals in synchronization with the timing signals from the CG 1121 under instructions from the main CPU 110, the processed image signals are sent to a YC processing section 116 via a bus 121. While the image signals are thus sent via the bus 121, a delay may occur between the processing at the WB adjustment γ processing section 114 and the processing at the YC processing section 116. Therefore, subsequent to the WB adjustment γ processing section 114, a buffer memory 115 is provided to adjust timing for transferring image signals to the YC processing section 116. From the buffer memory 115, image signals stored earlier are transferred first to the YC processing section 116 where the image signals are converted into YC signals through RGB-YC signal conversion. The YC signals are then sent via the bus 121 to a YC-RGB converter 151 where the received YC signals are again converted into RGB signals that are then sent to an LCD 15 via a driver 152. Based on the received RGB signals, the LCD 15 displays an image of a subject on the LCD panel 150. In synchronization with timing signals output from the CG 1121, the CCD 112 keeps generating image signals and the A/D section 113 and the WB adjustment γ processing section 114 keep processing the generated image signals. Therefore, an image of a subject, to which the shooting lens is directed, is continuously displayed on the LCD panel 150. When a user presses the release button 102 while looking at a continuously displayed subject image, after a lapse of predetermined time from the press of the release button 102, all the image signals of a subject image formed on the CCD 112 are output as RGB signals. These RGB signals are converted into YC signals in the YC processing section 116 and the YC signals are then compressed by a compression/decompression section 117. Subsequently, the compressed signals are recorded in a memory card 119 via an interface (I/F) 118. In the compression/decompression section 117, signals representing a still image are compressed by a compression method in conformity with JPEG standards and stored in the memory card 119 as a file. The file stored in the memory card 119 has a header in which compression information, shooting information, etc. are written. When the playback mode is selected by the mode lever 101e of the digital camera 100, the header of the file is read out from the memory card 119 first. Then, based on the compression information in the header read out, the compressed image signals in the file are decompressed so that the original image signals are restored. Subsequently, a subject image based on the restored original image signals is displayed on the LCD panel 150.

The digital camera 100 of the present embodiment is provided with the metering/distance-measuring CPU 120 for adjusting focus and exposure in addition to the main CPU 110. The metering/distance-measuring CPU 120 controls focus lens position as well as focal length and aperture change in an image-taking optical system 111.

To adjust the focus by controlling the position of a focus lens 1110, if a center-fixed AF mode, for example, among the AF modes is selected, an area for the center point is selected as a AF area (distance-measurement area) where distance measurement is to be performed, and the focus lens 1110 is driven based on the result of the distance measurement performed in the selected AF area. When the auto-area AF mode is selected, subject contrast is detected for each of the areas defined by the auxiliary dividing lines 1500 shown in FIG. 1(b), and an area with the highest subject contrast is regarded as a AF area (distance-measurement area) where distance measurement is to be performed. The focus lens is driven to move to a position corresponding to the result of the distance measurement performed in the selected AF area. When the selected-area AF mode is selected, distance measurement is performed in an AF area selected according to user operation, and the focus lens 1110 is driven to move to the position corresponding to the result of the distance measurement performed in the selected AF area.

In focal length adjustment, upon detecting the zoom key 101f being operated, the main CPU 110 provides an instruction to change the focal length to the light measurement/distance measurement CPU 120. According to the received instruction, the light measurement/distance measurement CPU 120 changes the focal length by driving a lens 1111.

In exposure adjustment, the results of light measurement performed in the AF area and the other areas are sent from the main CPU 110 to the metering/distance-measuring CPU 120, and the metering/distance-measuring CPU 120 determines, for example, an average brightness level. Based on the determined brightness level, the aperture size of a diaphragm 1112 is controlled so that an amount of light to be given to the imaging surface of the CCD 112 is adjusted.

Furthermore, in the digital camera 100 of this embodiment, in response to an instruction from the main CPU 110, the metering/distance-measuring CPU 120 controls light emission from the LED emission section 160 and the xenon-tube emission section 180. Specifically, the main CPU 110 determines a blur level of a subject image formed in the CCD 112 based on shake information provided by the angular-velocity sensor 1101 and focal length obtained before shooting. The determined level is regarded as a predicted level of a shake that will occur at the time of shooting because it is assumed here that a shake detected before shooting remains during shooting. The main CPU 110 also determines an emission time during which a necessary amount of light is to be emitted from the LED emission section 160. The main CPU 110 causes the LED emission section 160 to emit light at the time of shooting if the level of a blur in a subject image that will occur during the determined emission time falls within a predetermined acceptable blur circle. If the level of a blur in a subject image that will occur during the determined emission time is out of the predetermined acceptable blur circle, the main CPU 110 causes the xenon-tube emission section 180 to emit light at the time of shooting.

Actually, under instructions from the main CPU 110, the metering/distance-measuring CPU 120 causes a LED controller 16a and a xenon-tube controller 18a to control light emission from the LED emission section 160 and the xenon-tube emission section 180, respectively.

The digital camera 100 also includes a flash (fill-light) emission timing controller 140 that synchronizes emission timing with image-frame processing timing.

There will be described the main processing performed by the main CPU 110, which is described in the program stored in the EEPROM 110a. Subsequently, there will be described the details of exposure processing in the main processing, which relates to fill-light emission for shooting.

The main processing will be described with reference to FIG. 4.

Figure 4:
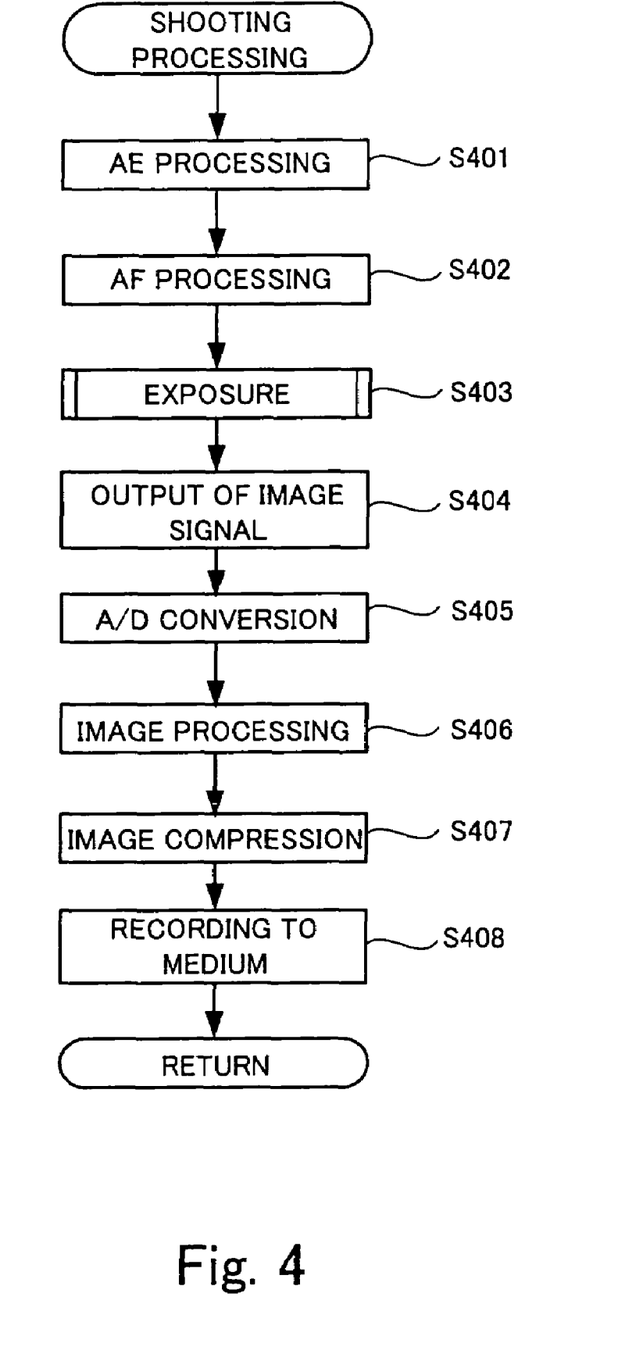
FIG. 4 is a flowchart showing the main processing performed by a main CPU.

FIG. 4 is a flowchart showing the main processing performed by the main CPU 110 for shooting an image by emitting fill-light to a subject.

In response to a half press of the release button 102, the main CPU 110 performs AE processing, i.e. TTL metering, at step S401 and causes the metering/distance-measuring CPU 120 to adjust the aperture of the diaphragm 112 based on the result of the AE processing. When a fill-light emission for shooting is necessary, the main CPU 110 determines an emission time having a length of time required for a light emission from the LED emission section 160.

Subsequently, the main CPU 110 performs AF processing at step S402. The digital camera 100 of the first embodiment has various AF modes such as the center-fixed AF mode, selected-area AF mode and auto-area AF mode. Therefore, it is possible to detect an optimum focus for each area by sampling brightness levels to obtain a subject contrast per area and a focus can be detected only for a selected area or a central area in the AF processing at step S402.

In the AF processing, even if any of the AF modes is selected, the main CPU 110 causes the metering/distance-measuring CPU 120 to move the focus lens 1110 so as to detect a focus by sampling subject contrasts for a predetermined distance-measurement area while the focus lens 1110 is moving, thereby measuring a subject distance. The main CPU 110 then transmits AF information including the measured subject distance to the metering/distance-measuring CPU 120, so that the metering/distance-measuring CPU 120 can move the focus lens 1110 to the focus position based on the AF information. Subsequently, at step S403, upon detection of a full press of the release button 102, the main CPU 110 transmits the detected timing to the metering/distance-measuring CPU 120 so that the metering/distance-measuring CPU 120 causes the CG 1121 to supply an exposure-starting signal to the CCD 112, allowing the CCD 112 to start exposure. If it is necessary to emit fill-light when the CCD 112 initiates the exposure, the main CPU 110 selects either the LED emission section 160 or the xenon-tube emission section 180 and causes the selected one to emit fill-light.

When the emission of the correct amount of light thus adjusted for each area is completed, the main CPU 110 closes the electronic shutter by causing the CG 1121 to supply an exposure-ending signal to the CCD 112 upon completion of the exposure and causes the CCD 112 to output image signals to the A/D section 113 at step S404. Subsequently at step S405, the main CPU 110 causes the A/D section 113 to convert analog image signals into digital image signals that are then sent to the WB adjustment γ processing section 114. At step S406, the main CPU 110 causes the WB adjustment γ processing section 114 to subject the image signals to image processing and the image signals after the image processing are then output to the buffer memory 115. The image signals received by the buffer memory 115 are then supplied to the YC processing section 116 at appropriate timing where the image signals are subjected to image processing. Subsequently at step S407, the main CPU 110 causes the compression/decompression section 117 to compress the image signals and causes the I/F 118 to record the compressed signals into the memory card 119 at step S408 and the flow ends.

The digital camera 100 of the present embodiment is intended to reduce the waiting time between one shooting and the next shooting and to reduce blurriness of a subject image by selecting the type of fill-light for shooting according to a camera shake level. In this connection, the exposure processing at step S403 will be described below more in detail.

Figure 5:
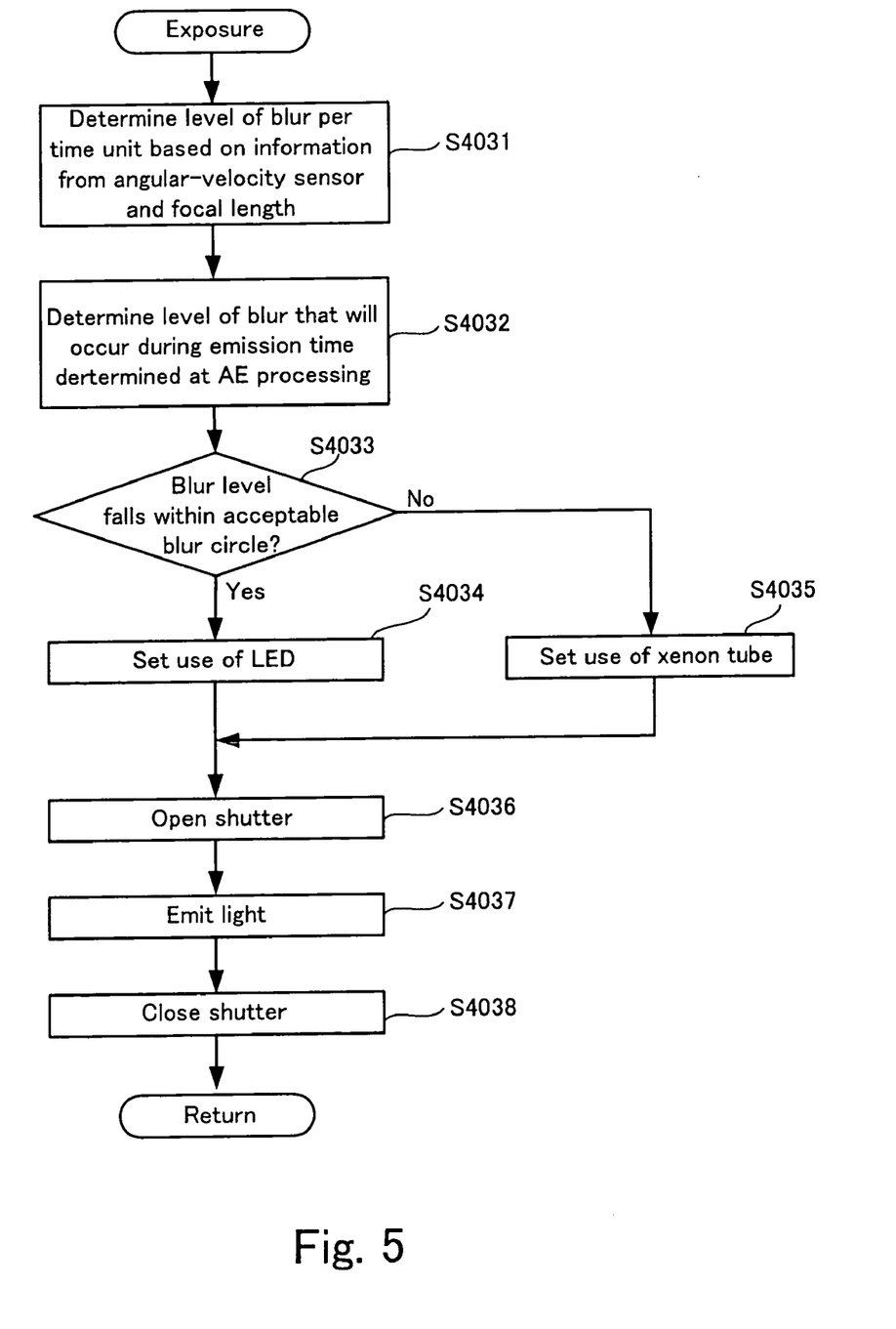
FIG. 5 is a flowchart showing the details of exposure processing.

FIG. 5 is a flowchart showing the details of the exposure processing at step S403.

At step S4031, the main CPU 110 determines a blur level of a subject image per time unit based on shake information provided from the angular-velocity sensor 1101 and focal length.

Subsequently, at step S4032, the main CPU 110 determines a level of a blur in the subject image that will occur during the emission time determined in the AE processing at step S401 in FIG. 4.

Subsequently, at step S4033, it is determined whether the blur level falls within a predetermined acceptable blur circle. If it is determined that the blur level is out of the acceptable blur circle, i.e. the blur of the subject image due to a camera shake is not acceptable for use of the LED emission section 160, which means the camera shake is above a predetermined level, the flow proceeds to step S4035. At step S4035, the use of the xenon-tube emission section 180 is set, which is capable of emitting a necessary amount of high-intensity light in a short time. On the contrary, if it is determined that the blur level falls within the acceptable blur circle, i.e. the blur of the subject image due to a camera shake is acceptable for use of the LED emission section 160, which means the camera shake is equal to or below the predetermined level, the flow proceeds to step S4034. At step S4034, the use of the LED emission section 160 is set.

Subsequently at step S4036, the main CPU 110 causes, via the metering/distance-measuring CPU 120, the CG 1121 to supply an exposure-starting signal to the CCD 112 in order to open the electronic shutter. Subsequently at step S4037, fill-light is emitted from the LED emission section 160 set in step S4034 or the xenon-tube emission section 180 set in step S4035. At this step, the amount of reflected light is integrated while the fill-light is emitted, and the light emission is stopped when the value obtained by the integration has reached a predetermined value. Fill-light emission may be composed of two emissions: pre- emission and actual emission, and the actual emission may be adjusted based on the reflected light of the pre-emission.

Subsequently at step S4038, the CPU 110 closes the electronic shutter and the flow ends.

As described above, in the digital camera 100 of the first embodiment, either the LED emission section 160 or the xenon-tube emission section 180 is selected according to a shake level. For example, when the digital camera 100 is stably held so that a camera shake is unlikely to occur, fill-light is emitted from the LED emission section 160 allowing a short waiting time for the next emission and enabling high-speed sequential shootings. On the other hand, when the digital camera 100 is in unstable state, for example, when a shooting is made by an inexperienced user so that a large camera shake is likely to occur, high-intensity light is emitted in a short time from the xenon-tube emission section 180 reducing blurriness of a subject image. Therefore, according to the first embodiment, it is possible to realize a digital camera capable of reducing the waiting time between shootings as well as reducing blurriness of a subject image. In addition, according to the digital camera 100 of the first embodiment, it is possible to achieve induction in production cost due to a simple structure compared to, for example, a camera configured to correct camera shakes by use of a lens driven according to shake levels. Besides, the digital camera 100 of the first embodiment can generate images signals representing an image of higher quality than a camera that corrects camera shakes by cutting out a part of a subject image formed on an imaging device.

A subject image formed on the CCD 12 expands and contracts depending on the focal length of the shooting lens, i.e. the blur level of a subject image changes according to the focal length. However, in the digital camera 100 of the first embodiment, because selection of the LED emission section 160 or the xenon-tube emission section 180 is performed based on both the result of a shake detection and a focal length of the shooting lens to be used at shooting, it is possible to appropriately reduce blurriness of a subject image. The invention is not limited to the above-described embodiment and may be applied to, for example, a digital camera with a lens of fixed focal length and a digital camera with a lens of narrow-ranged variable focal length. In these cameras, selection of emission from LED or emission from xenon tube may be performed regardless of the focal length of a shooting lens.

Figure 6:
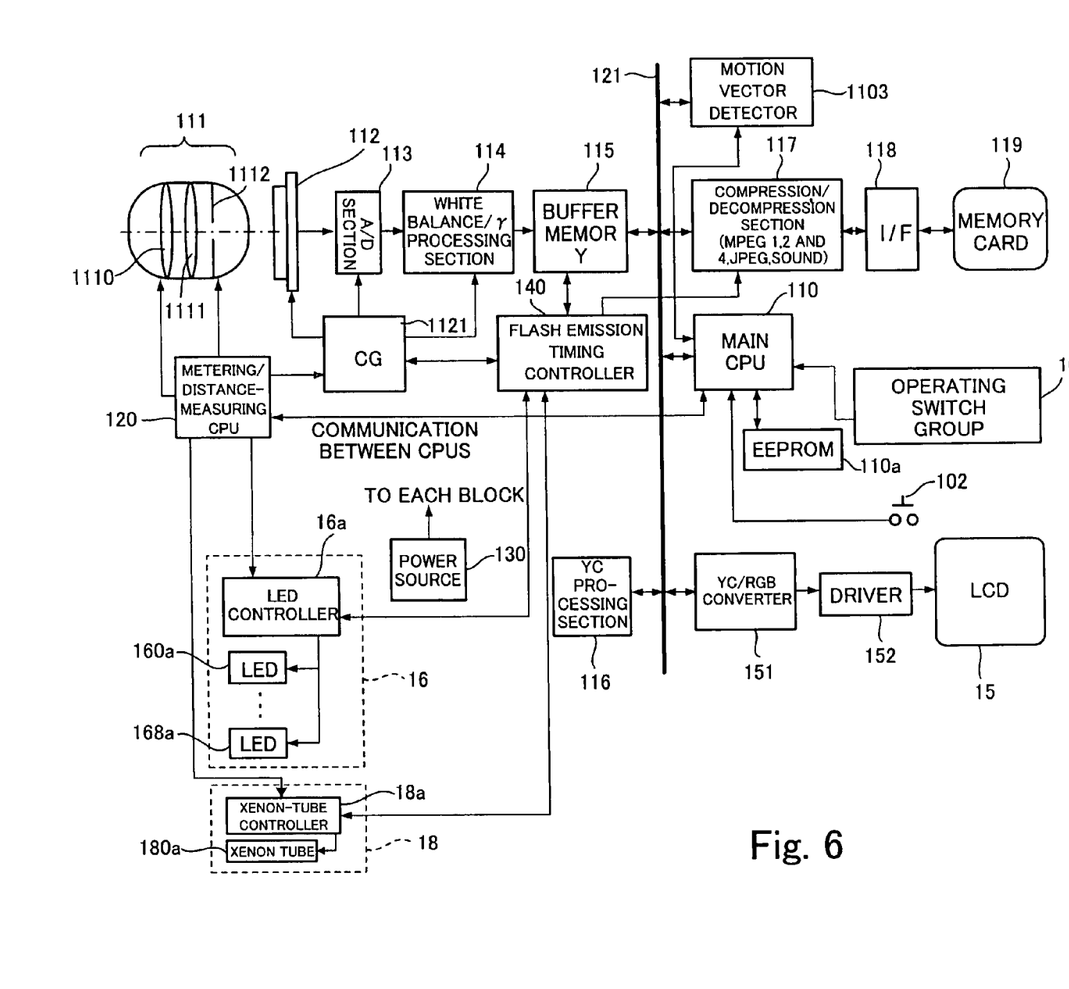
FIG. 6 is a block diagram illustrating the internal configuration of a digital camera according to a second embodiment.
Figure 7:
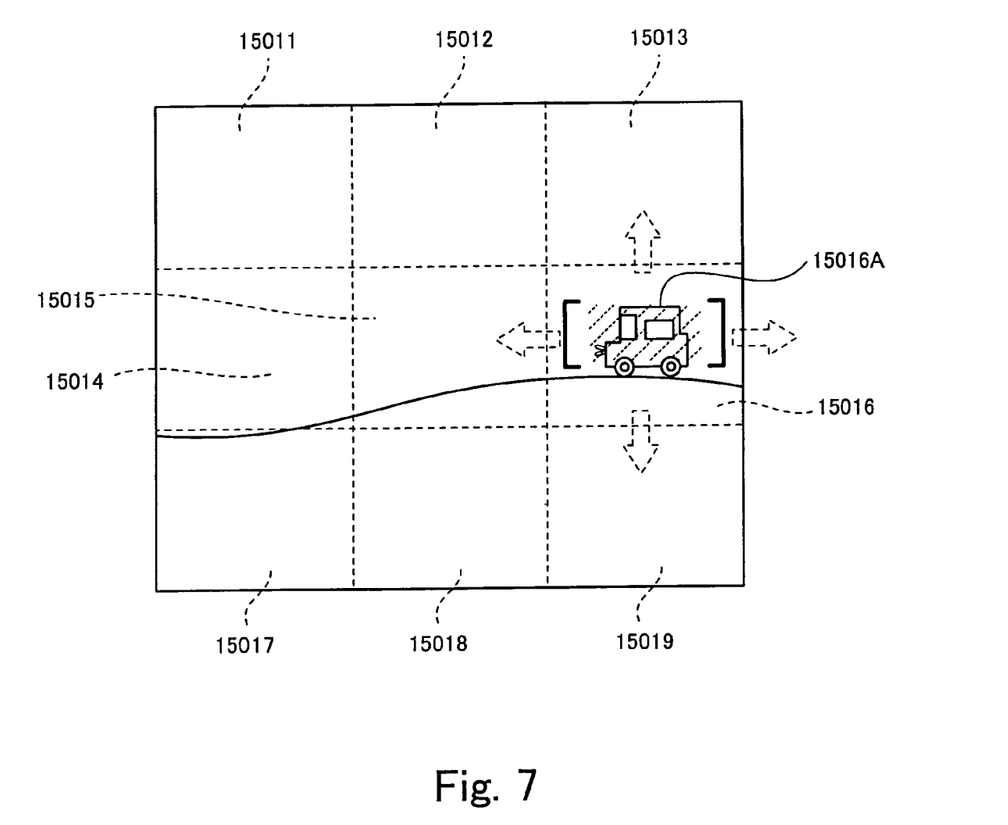
FIG. 7 is a diagram showing distance-measurement areas into which a shooting angle of view is two-dimensionally divided.
Figure 8:
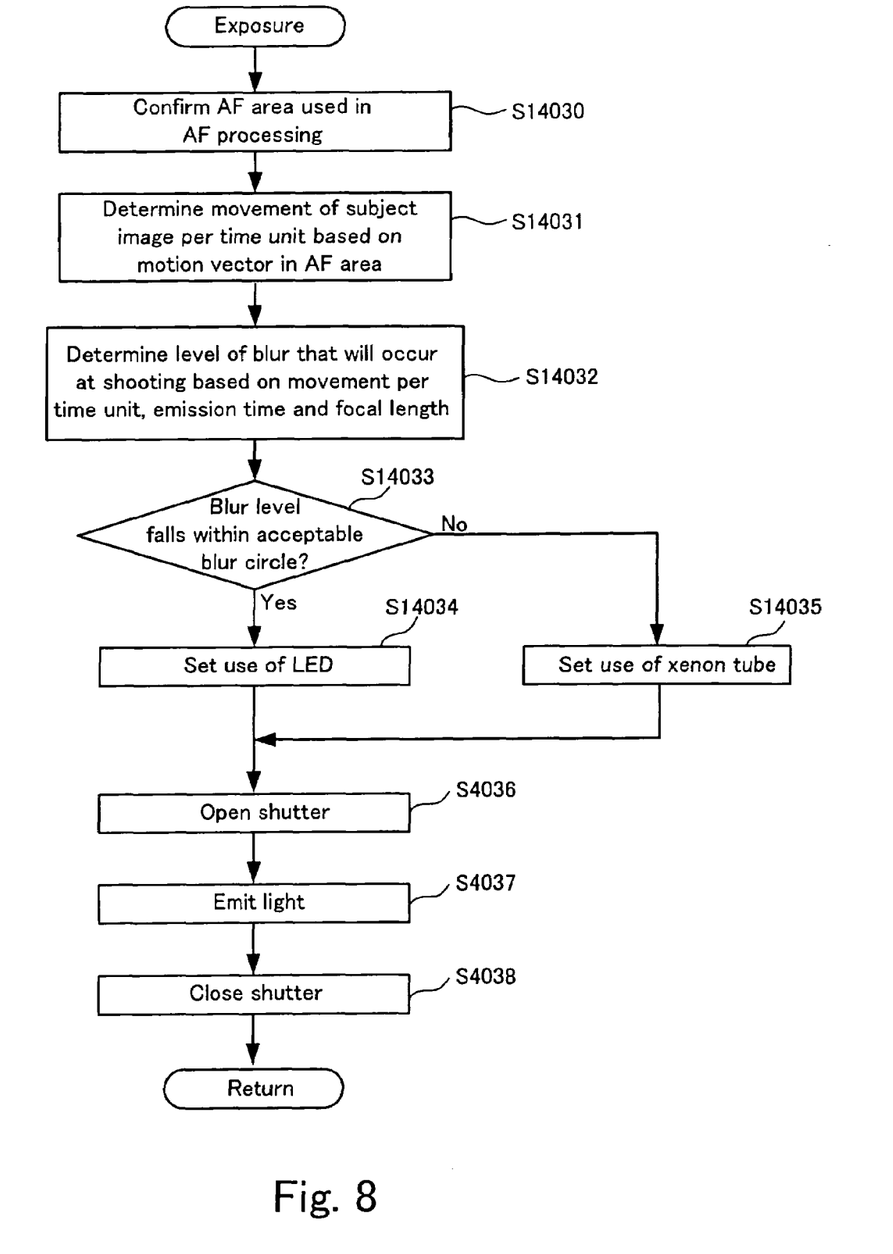
FIG. 8 is a flowchart showing the details of exposure processing performed by a main CPU of the digital camera according to the second embodiment.

FIGS. 6, 7 and 8 are diagrams to describe a second embodiment according to the invention.

FIG. 6 is a block diagram illustrating the internal configuration of a digital camera according to the second embodiment.

The digital camera of the second embodiment is the same as the digital camera 100 of the first embodiment shown in FIG. 2 except that a motion vector detector 1103 is provided in place of the angular-velocity sensor 1101. The motion vector detector 1103 detects a subject-image movement formed on a CCD 112 by reading out image signals from a buffer memory 115 and comparing the read-out image signals with previously read-out image signals and outputs the result of the detection as a motion vector. What the motion vector detector 1103 detects here is a subject-image movement in an area designated by a main CPU 110. The main CPU 110 designates a distance-measurement area, i.e. AF area, selected as an area to be focused from among plural distance-measurement areas and informs the motion vector detector 1103 of the designated AF area. The motion vector detector 1103 detects a movement of a subject image in the AF area to predict the level of a blur of a subject image that will occur at the time of shooting.

FIG. 7 shows distance-measurement areas 15011, 15012, 15013, 15014, 15015, 15016, 15017, 15018 and 15019 set up in a shooting angle of view. The shooting angle of view is two-dimensionally divided into nine areas (3×3=9). In the example shown in FIG. 7, the area 15016 is selected as an AF area from among the areas 15013 through 15019 and a subject 15016A in the selected area 15016 is made to be in focus. In this case, the motion vector detector 1103 detects a movement of an image of the subject 15016A in the area 15016.

Since other elements and the appearance of the digital camera according to the second embodiment are the same as those of the first embodiment shown in FIGS. 1 and 2, the same reference characters as those of the first embodiment are used here and the description thereof will be omitted.

FIG. 8 is a flowchart showing the details of exposure processing performed by the main CPU 110 of the digital camera of the second embodiment. The main processing of the second embodiment is the same as that of the first embodiment shown in FIG. 4 and therefore, the description thereof will be omitted.

First, at step S14030, the main CPU 110 confirms a distance-measurement area (AF area) where the subject is made to be in focus at the AF processing at step S402. Subsequently at step S14031, the main CPU 110 determines a subject-image movement per time unit based on a movement of a subject image in the AF area. Specifically, the main CPU 110 informs the motion vector detector 1103 of the confirmed AF area where a movement of a subject image is to be detected by the motion vector detector 1103 and determines a subject-image movement per time unit based on a motion vector provided from the motion vector detector 1103.

Subsequently at step S14032, based on the subject-image movement per time unit, an emission time required for emission from the LED emission section 160 obtained at step S401 and the focal length of a shooting lens, the main CPU 110 determines a subject-image movement on the CCD 112 that will occur during the emission time. The thus determined movement is regarded as a blur in the subject image that will occur during the emission time.

Subsequently at step S14033, it is determined whether or not the obtained subject-image movement falls within a predetermined acceptable blur circle. When it is determined that the subject-image movement is out of the predetermined acceptable blur circle, i.e. the blur of the subject image is not acceptable for use of the LED emission section 160, which means the movement detected by the motion vector detector 1103 is above a predetermined level, the flow proceeds to step S14035. At step S14035, the use of the xenon-tube emission section 180 is set, which is capable of emitting a necessary amount of high-intensity light in a short time. On the contrary, if it is determined that the subject-image movement falls within the acceptable blur circle, i.e. the blur of the subject image is acceptable for use of the LED emission section 160, which means the movement detected by the motion vector detector 1103 is equal to or below the predetermined level, the flow proceeds to step S14034. At step S14034, the use of the LED emission section 160 is set.

The processing at step S4036 thereafter in FIG. 8 is the same as that shown in FIG. 4 and therefore, step S4036 and subsequent steps are denoted by the same numbers as those shown in FIG. 4 and the description thereof will be omitted.

In this way, the main CPU 110 causes either the LED emission section 160 or the xenon-tube emission section 180 to emit light according to a subject-image movement detected before shooting. Blurs of subject image include those caused by movements of a subject in addition to those caused by camera shakes. The digital camera of the second embodiment is configured to directly detect a subject-image movement and emit high-intensity light in a short time from the xenon-tube emission section 180 if the detected movement is large. Accordingly, it is possible to reduce not only blurriness caused by camera shakes but also blurriness caused by subject movements.

In the second embodiment, a subject image is sharply formed in the AF area and therefore, this area usually receives more attention and a blur is most likely to be observed here. For this reason, the elimination of blur is desired most in the AF area. The digital camera of the second embodiment can reduce blurriness in such an area.

Figure 9:
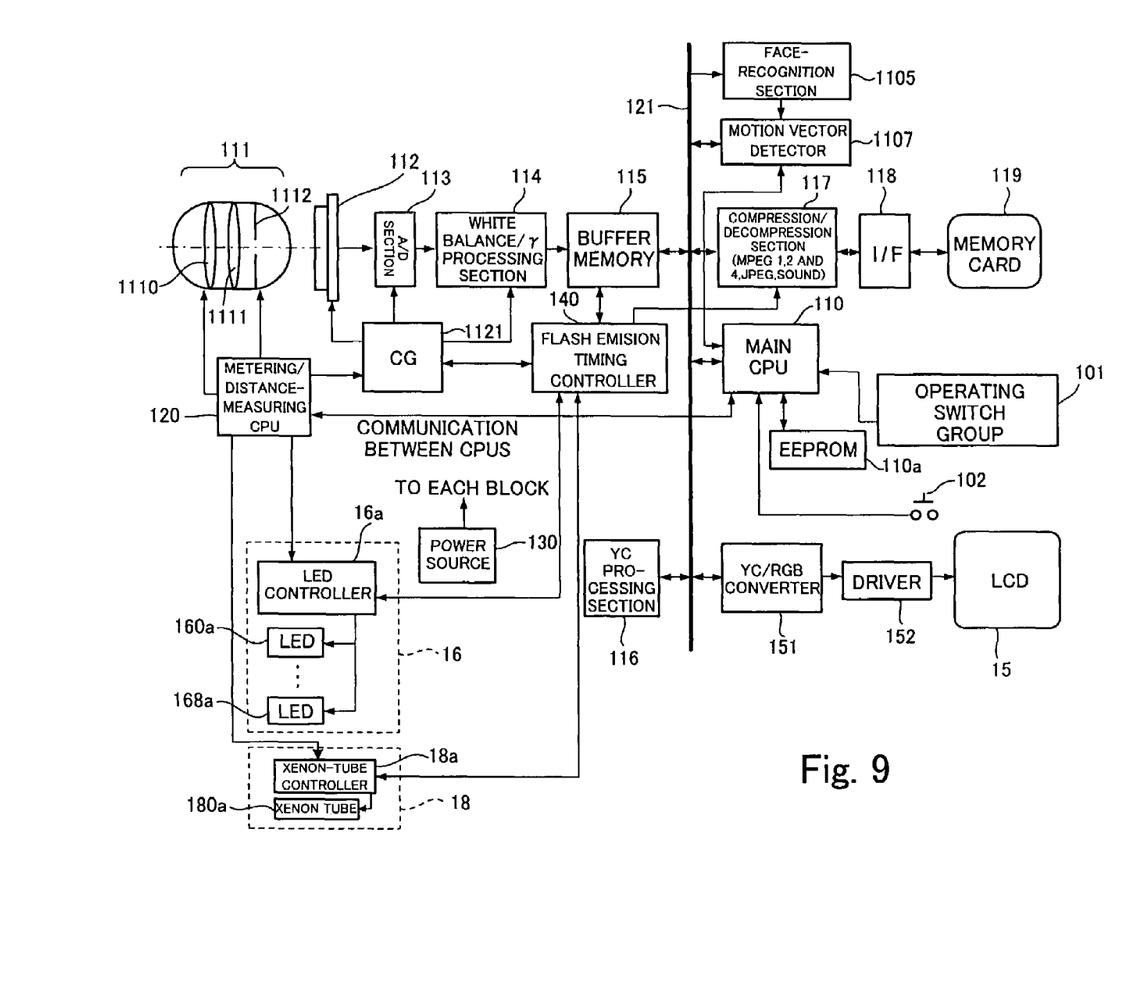
FIG. 9 is a block diagram illustrating the internal configuration of a digital camera according to a third embodiment.
Figure 10:
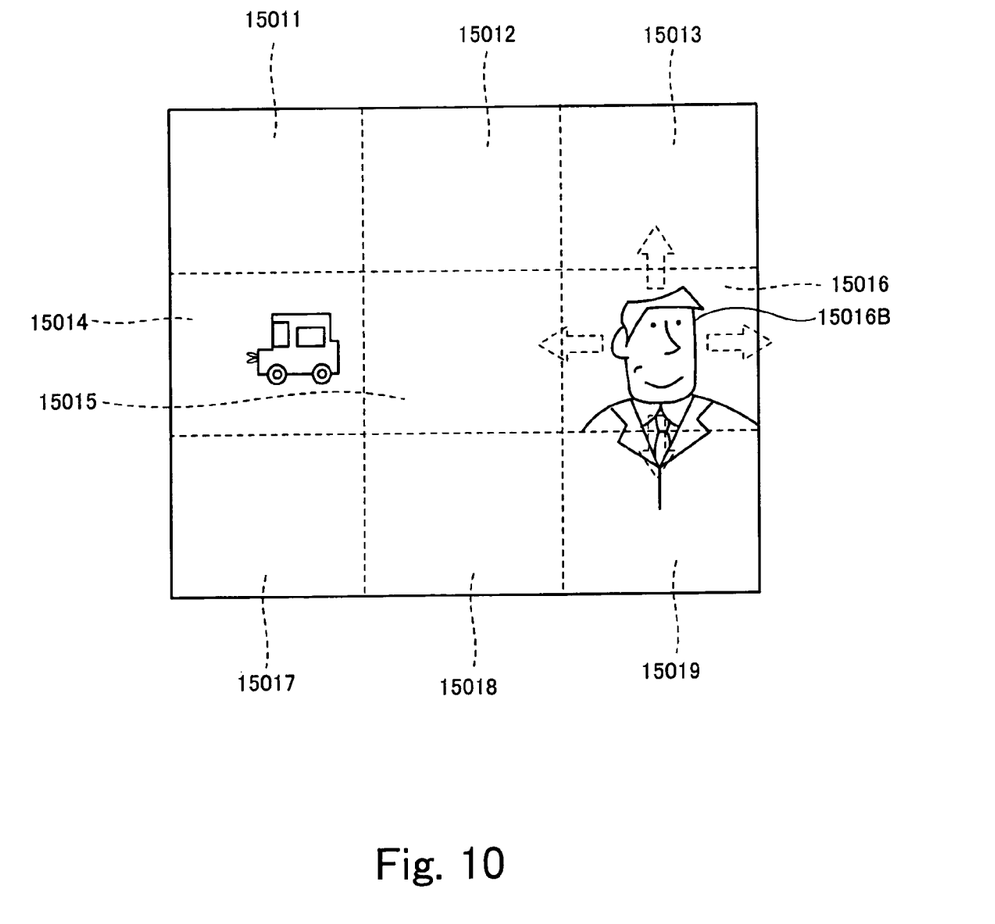
FIG. 10 is another diagram showing distance-measurement areas into which a shooting angle of view is two-dimensionally divided.
Figure 11:
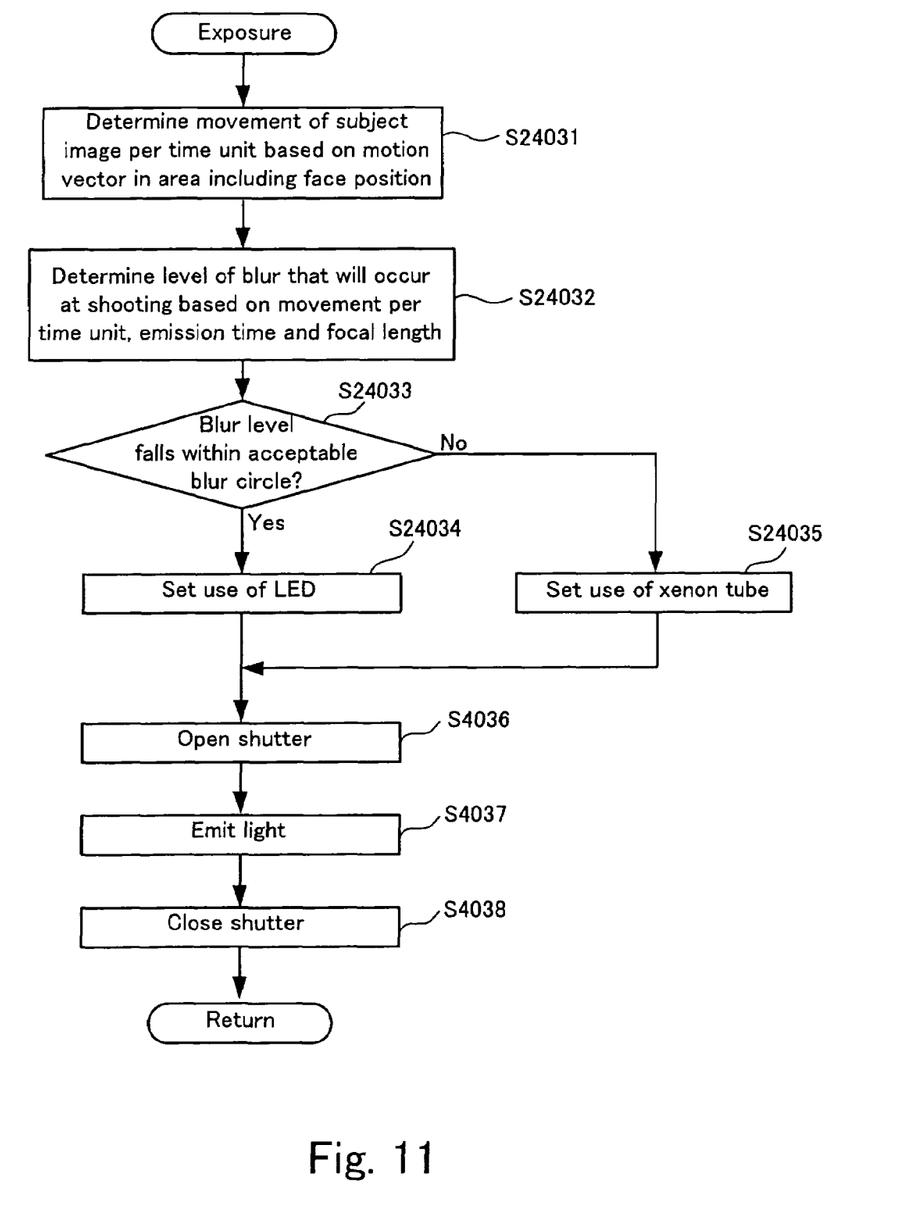
FIG. 11 is a flowchart showing the details of exposure processing performed by a main CPU of the digital camera according to the third embodiment.

FIGS. 9, 10 and 11 are diagrams showing a third embodiment according to the invention.

FIG. 9 is a block diagram illustrating the internal configuration of a digital camera according to the third embodiment.

The digital camera of the third embodiment is the same as the digital camera 100 of the first embodiment shown in FIG. 2 except that a face-recognition section 1105 and a motion vector detector 1107 for detecting a subject-image movement in an area including a face position detected by the face-recognition section 1105 are provided in place of the angular-velocity sensor 1101.

Since other elements and the appearance of the digital camera according to the third embodiment are the same as those of the first embodiment shown in FIGS. 1 and 2, the same reference characters as those of the first embodiment are used here and the description thereof will be omitted.

FIG. 10 shows distance-measurement areas 15011, 15012, 15013, 15014, 15015, 15016, 15017, 15018 and 15019 set up in a shooting angle of view. The shooting angle of view is two-dimensionally divided into nine areas (3×3=9). In the example shown in FIG. 10, a face position of a subject 15016B is detected in the area 15016 among the areas 15011 through 15019. In this case, the motion vector detector 1107 detects a movement an image of the subject 15016B in the area 15016.

FIG. 11 is a flowchart showing the details of exposure processing performed by a main CPU 110 of the digital camera of the third embodiment. The main processing of the third embodiment is the same as that of the first embodiment shown in FIG. 4 and therefore, the description thereof will be omitted.

First, at step S24031, the main CPU 110 determines a subject-image movement per time unit based on a motion vector in an area including a face position. Specifically, the main CPU 110 provides the motion vector detector 1107 with information about an area including a face position detected by the face-recognition section 1105 and the motion vector detector 1107 detects a subject-image movement in the area included in the received information. Therefore, at step S24031, a subject-image movement, i.e. a blur, at the recognized face position is detected.

Subsequently at step S24032, based on the subject-image movement per time unit, an emission time required for emission by the LED emission section 160 obtained at step S401 and the focal length of a shooting lens, the main CPU 110 determines a subject-image movement on the CCD 112 that will occur during the emission time. The thus determined movement is regarded as a blur that will occur in the subject image during the emission time.

Subsequently at step S24033, it is determined whether or not the determined subject-image movement falls within a predetermined acceptable blur circle. When it is determined that the subject-image movement is out of the predetermined acceptable blur circle, i.e. the blur of the subject image is not acceptable for use of the LED emission section 160, which means the movement detected by the motion vector detector 1107 is above a predetermined level, the flow proceeds to step S24035. At step S24035, the use of the xenon-tube emission section 180 is set, which is capable of emitting a necessary amount of high-intensity light in a short time. On the contrary, if it is determined that the subject-image movement falls within the acceptable blur circle, i.e. the blur of the subject image is acceptable for use of the LED emission section 160, which means the movement detected by the motion vector detector 1107 is equal to or below the predetermined level, the flow proceeds to step S24034. At step S24034, the use of the LED emission section 160 is set. The processing at step S4036 thereafter in FIG. 11 is the same as that shown in FIG. 4 and therefore, step S4036 and subsequent steps are denoted by the same numbers as those shown in FIG. 4 and the description thereof will be omitted.

In this way, the main CPU 110 causes either the LED emission section 160 or the xenon-tube emission section 180 to emit light according to a subject-image movement detected before shooting.

Usually, a face position detected by the face-recognition section 1105 receives more attention. For this reason, the elimination of blur is desired most in an area including the face position. According to the digital camera of the third embodiment, it is possible to reduce blurriness of a subject image in an area where the elimination of blur is desired most by detecting a blur in a face position. In addition, because a blur in a face position is detected, it is possible to select either the LED emission section 160 or the xenon-tube emission section 180 based on the detected blur in the face position regardless of high-contrast potions or fast-moving portions other than the face position even if such portions are present.

The second and third embodiments each correspond to an example of the second image-taking apparatus according to the invention.

When the CPU 110 shown in FIG. 2 performs the processing at steps S4031 and S4032, the combination of the processing at these steps and hardware such as the main CPU 110 and the angular-velocity sensor 1101 corresponds to an example of the shake detection section of the first image-taking apparatus according to the invention.

Further, when the CPU 110 shown in FIG. 6 performs the processing at steps S14030 through S14032, the combination of the processing at these steps and hardware such as the main CPU 110 corresponds to an example of the blur detection section of the second image-taking apparatus according to the invention.

Still further, when the CPU 110 shown in FIG. 6 performs the processing at step S402, the combination of the processing at this step and hardware such as the main CPU 110 and the metering/distance-measuring CPU 120 corresponds to an example of the focus adjustment section of the second image-taking apparatus according to the invention.

Furthermore, when the CPU 110 shown in FIG. 6 performs the processing at step S402, the combination of the processing at this step and hardware such as the main CPU 110 and the metering/distance-measuring CPU 120 corresponds to an example of the focus adjustment section of the second image-taking apparatus according to the invention.

Still furthermore, when the CPU 110 shown in FIG. 2 performs the processing at steps S4033 through S4035 shown in FIG. 5, the combination of the processing at these steps and hardware such as the main CPU 110 and the metering/distance-measuring CPU 120 corresponds to an example of the emission control section of the image-taking apparatus according to the invention. This also holds true for the CPUs 110 shown in FIGS. 6 and 9 when these CPUs perform steps S14033 through S14035 shown in FIG. 8 and steps S24033 through S24035 shown in FIG. 11, respectively.

In the first embodiment, the angular-velocity sensor 1101 has been described as an example of the shake detection section according to the invention. However, the shake detection section of the invention is not limited thereto and may be any other type of sensor as long as it is capable of detecting a shake of the image-taking apparatus.

In the second and third embodiments, the motion vector detectors 1103 and 1107 have been each described as an example of the blur detection section according to the invention. However, the blur detection section of the invention is not limited thereto and may be implemented as a part of the processing performed by the main CPU 110 or may be implemented by a motion vector detector for compressing moving-image frames built in the compression/depression section 117.

Further, although the face-recognition section 1105 has been described as an element independent of the main CPU 110, the face-recognition section of the invention is not limited thereto and may be implemented as a part of the processing performed by the main CPU 110.

What is claimed is:

1. An image-taking apparatus that includes an imaging device and generates image signals by forming a subject image on the imaging device, comprising:
    a LED emission section that includes a LED and irradiates a subject with light by causing the LED to emit the light;
    a xenon-tube emission section that includes a xenon tube and irradiates a subject with light by causing the xenon tube to emit the light, the light from the xenon-tube emission section having relatively higher intensity than the light from the LED emission section;
    a shake detection section that predicts a shake that will occur at shooting by detecting a shake before shooting, and
    an emission control section that causes the xenon-tube emission section to irradiate a subject with light when the shake detected by the shake detection section is above a predetermined level, and causes the LED emission section to irradiate a subject with light when the shake detected by the shake detection section is equal to or below the predetermined level.

2. The image-taking apparatus according to claim 1, further comprising a shooting lens of variable focal length,
    wherein the emission control section causes either one of the xenon-tube emission section and the LED emission section to irradiate a subject with light based on both the shake detected by the shake detection section and a focal length of the shooting lens to be used at shooting.

3. An image-taking apparatus that includes an imaging device and generates image signals by forming a subject image on the imaging device, comprising:
    a LED emission section that includes a LED and irradiates a subject with light by causing the LED to emit the light;
    a xenon-tube emission section that includes a xenon tube and irradiates a subject with light by causing the xenon tube to emit the light, the light from the xenon-tube emission section having relatively higher intensity than the light from the LED emission section;
    a blur detection section that predicts a blur of a subject image which will occur at shooting by detecting a movement of a subject image before shooting, and
    an emission control section that causes the xenon-tube emission section to irradiate a subject with light when the blur detected by the blur detection section is above a predetermined level, and causes the LED emission section to irradiate a subject with light when the blur detected by the blur detection section is equal to or below the predetermined level.

4. The image-taking apparatus according to claim 3, further comprising a focus adjustment section that selects any of a plurality of areas, into which a shooting angle of view is divided, to adjust focus in the selected area,
    wherein the blur detection section detects a blur of a subject image in the area selected by the focus adjustment section.

5. The image-taking apparatus according to claim 3, further comprising a face recognition section that recognizes a face position of a subject within the shooting angle of view,
    wherein the blur detection section detects a blur of a subject image in the face position recognized by the face recognition section.

* * * * *